US008761840B2

(12) United States Patent
Dunko

(10) Patent No.: US 8,761,840 B2
(45) Date of Patent: *Jun. 24, 2014

(54) METHODS, DEVICES AND COMPUTER PROGRAM PRODUCTS FOR OPERATING MOBILE DEVICES RESPONSIVE TO USER INPUT THROUGH MOVEMENT THEREOF

(75) Inventor: Gregory A. Dunko, Cary, NC (US)

(73) Assignees: Sony Corporation, Tokyo (JP); Sony Mobile Communications AB, Lund (SE)

(*) Notice: Subject to any disclaimer, the term of this patent is extended or adjusted under 35 U.S.C. 154(b) by 316 days.

This patent is subject to a terminal disclaimer.

(21) Appl. No.: 13/239,927

(22) Filed: Sep. 22, 2011

(65) Prior Publication Data

US 2012/0009982 A1 Jan. 12, 2012

Related U.S. Application Data

(63) Continuation of application No. 11/193,876, filed on Jul. 29, 2005, now Pat. No. 8,046,030.

(51) Int. Cl.
*H04M 1/66* (2006.01)

(52) U.S. Cl.
USPC ........ 455/567; 455/407; 455/408; 455/550.1; 455/557; 341/20; 341/21; 341/158

(58) Field of Classification Search
USPC ......... 455/567, 407, 418, 550.1, 557; 341/21, 341/58
See application file for complete search history.

(56) References Cited

U.S. PATENT DOCUMENTS

| | | | |
|---|---|---|---|
| 6,369,794 B1 | 4/2002 | Sakurai et al. | |
| 6,529,144 B1 | 3/2003 | Nilsen et al. | |
| 7,301,527 B2 | 11/2007 | Marvit | |
| 7,301,529 B2 | 11/2007 | Marvit et al. | |
| 7,302,280 B2 | 11/2007 | Hinckley et al. | |
| 2002/0065104 A1 | 5/2002 | Hess et al. | |

(Continued)

FOREIGN PATENT DOCUMENTS

| | | |
|---|---|---|
| EP | 1536207 | 6/2005 |
| GB | 2347593 | 9/2000 |

(Continued)

OTHER PUBLICATIONS

European Office Action; Application No. 06 740 608.2-1245; Feb. 10, 2010.

(Continued)

*Primary Examiner* — Ajit Patel
*Assistant Examiner* — Julio Perez
(74) *Attorney, Agent, or Firm* — Myers Bigel Sibley & Sajovec, P.A.

(57) ABSTRACT

A mobile device having first and second modes of operation is operated responsive to detection of a predefined localized movement of a housing of the mobile device using a sensor associated therewith. The detected predefined localized movement is associated with first and second functions of the mobile device responsive to a user input assigning the detected predefined localized movement thereto. A first device function is performed responsive to detection of the predefined localized movement in the first mode of operation, and a second device function is performed responsive to detection of the predefined localized movement in the second mode of operation. A predetermined delay time may also be associated with the predefined localized movement, and the first and/or second functions may be performed at the predetermined delay time after detecting the predefined localized movement.

19 Claims, 6 Drawing Sheets

(56) References Cited

U.S. PATENT DOCUMENTS

| | | | |
|---|---|---|---|
| 2002/0143489 | A1 | 10/2002 | Orchard |
| 2003/0076343 | A1 | 4/2003 | Fishkin et al. |
| 2004/0125073 | A1 | 7/2004 | Potter et al. |
| 2004/0239626 | A1 | 12/2004 | Noguera |
| 2004/0259591 | A1 | 12/2004 | Grams et al. |
| 2006/0060068 | A1 | 3/2006 | Hwang et al. |
| 2006/0105817 | A1 | 5/2006 | Naick et al. |
| 2006/0240853 | A1 | 10/2006 | Donner et al. |
| 2007/0186192 | A1 | 8/2007 | Wigdor |

FOREIGN PATENT DOCUMENTS

| | | |
|---|---|---|
| JP | 2001036628 A | 2/2001 |
| JP | 2002237871 A | 8/2002 |
| JP | 2002291047 A | 10/2002 |
| JP | 2003163742 A | 6/2003 |
| WO | WO 03/001340 | 1/2003 |

OTHER PUBLICATIONS

Japanese Office Action; Application No. 2008-523867; Mar. 12, 2010.

Anonymous "NerdAlert von Hottrix", Internet Article—URL:http//www.handango.de/PlatformProductDetail.jsp?siteId=8&jid=7534B8965C75X14F93A424B2756B193A&platformId=1&productType=2&catalog=0sectionId=0&productId=22323> XP-002392905 (Feb. 19, 2001).

Notification of Transmittal of the International Search Report and the Written Opinion of the International Searching Authority, or the Declaration corresponding to PCT/US2006/012813 mailed on Aug. 22, 2006.

Rubin "Tilt and Motion Sensors in Mobiles", *Cool Hunting* (2005).

Mochizuki "Playing Games by Shaking Mobile Phone Handset", *NEASIA Online* (2005).

"Vodafone K.K. launches motion, tv phones", www.mobiletracker.net/archives (2005).

"Motion-sensitive cell phones reveal an industry open to innovation", www.newstarget.com/004367 (2005).

"Aichi Steel and Vodafone: Joint Development of the World's Smallest $G^2$ Motion Sensor™", www.aichi-steel.co.jp (2005).

"New Powerbook controlled with a shake", *New Scientist Magazine*, 2492:26 (2005).

Hussain "Samsung's 3D Motion Sensor", www.news.mobile9.com (2005).

"Motorola RAZR V3 Special Edition", www.phoneinsider.com/index.php/articles/?startnum=31 (2005).

METHODS, DEVICES AND COMPUTER PROGRAM PRODUCTS FOR OPERATING MOBILE DEVICES RESPONSIVE TO USER INPUT THROUGH MOVEMENT THEREOF

RELATED APPLICATION

This application is a continuation of U.S. patent application Ser. No. 11/193,876, filed Jul. 29, 2005, now U.S. Pat. No. 8,046,030 the contents of which are hereby incorporated by reference as if recited in full herein.

BACKGROUND OF THE INVENTION

The present invention relates to electronic devices and methods of operating the same, and, more particularly, to mobile device user input and methods thereof.

Mobile electronic devices, such as mobile terminals, increasingly provide a variety of communications, multimedia, and/or data processing capabilities. For example, mobile terminals, such as cellphones, personal digital assistants, and/or laptop computers, may provide storage and/or access to data in a wide variety of multimedia formats, including text, pictures, music, and/or video.

However, data and/or applications stored on a mobile device can be difficult to manage, for example, due to the relatively small size of the device and the limited input devices provided. For example, many mobile terminals, such as cellphones, may be equipped with digital camera functionality. Yet, when an image captured using the digital camera is displayed on the mobile terminal, it may be difficult to select and/or manipulate the displayed image using the keypad. As such, mobile devices may include alternative input devices, such as sensor devices responsive to touch, light and/or motion.

In particular, mobile devices may include motion sensors, such as tilt sensors and/or accelerometers. As such, applications may be included in mobile devices that take advantage of these capabilities for operation and/or for manipulation of data. For example, it is known to provide menu navigation and selection on a mobile device via tilting and/or shaking the housing of the device. Similarly, it is known to provide video games on a mobile device that utilize predefined motions of the device housing for manipulation of one or more on-screen characters or the like. More specifically, by tilting the device housing, a user can move an on-screen character in one of eight directions. In both cases, the motion sensor may assess the movement of the device housing and execute a desired action associated with the movement.

SUMMARY OF THE INVENTION

According to some embodiments of the present invention, a method of operating a mobile device having first and second modes of operation may include detecting a predefined localized movement of a housing of the mobile device using a sensor associated with the mobile device. The detected predefined localized movement may be associated with first and second functions of the mobile device responsive to a user input assigning the detected predefined localized movement thereto. The first function may be performed responsive to detecting the predefined localized movement in the first mode of operation, and the second function may be performed responsive to detecting the predefined localized movement in the second mode of operation.

In some embodiments of the present invention, the method may include associating a predetermined delay time with the detected predefined localized movement. The first and/or second functions may be performed at the predetermined delay time after detecting the predefined localized movement.

In other embodiments of the present invention, the predefined localized movement may be detected by detecting a localized movement of the housing in a user-defined pattern using the sensor, and storing parameters generated by the sensor corresponding to the user-defined pattern in a memory of the mobile device to define the predefined localized movement.

In some embodiments of the present invention, the predefined localized movement may be detected in a motion programming mode of operation of the mobile device that is different from the first and second modes of operation. For example, the first mode of operation may be a communication mode, and the second mode of operation may be a standby mode. Alternatively, one or both of the first and second modes of operation may be an application execution mode in which a particular application on the mobile device is executing.

In other embodiments of the present invention, the first and/or second functions may be performed responsive to concurrently detecting the predefined localized movement and depression of a button of the mobile device. Examples of predefined localized movements may include tilting, shaking, waving, and/or snapping the mobile device housing.

In some embodiments of the present invention, the predefined localized movement may be a sweeping motion, the first mode of operation may be a standby mode, and the second mode of operation may be a messaging application execution mode. As such, a search for wireless devices and/or networks in a vicinity of the mobile device may be performed responsive to detecting the sweeping motion in the standby mode, and presence information may be updated responsive to detecting the sweeping motion in the messaging application execution mode.

In other embodiments of the present invention, the predefined localized movement may be an alphanumeric motion, the first mode of operation may be a standby mode, and the second mode of operation may be a messaging application execution mode. As such, a number associated with the alphanumeric motion may be dialed responsive to detecting the alphanumeric motion in the standby mode, and a character associated with the alphanumeric motion may be displayed responsive to detecting the alphanumeric motion in the messaging application execution mode.

In some embodiments of the present invention, the predefined localized movement may be a turn-over motion, the first mode of operation may be a standby mode, and the second mode of operation may be a communication mode. As such, an incoming call may be rejected responsive to detecting the turn-over motion in the standby mode, and a speakerphone of the mobile device may be activated responsive to detecting the turn-over motion in the communication mode.

According to further embodiments of the present invention, a method of operating a mobile device may include performing a function of the mobile device at a predetermined delay time after detecting a predefined localized movement of a housing of the mobile device. In some embodiments of the present invention, a first predefined localized movement of the housing may be detected using a sensor associated therewith. The detected first predefined localized movement may be associated with a function of the mobile device. The function may be performed responsive to detecting the first predefined localized movement and at a predetermined delay time after detecting a second predefined localized movement of the housing of the mobile device.

In other embodiments of the present invention, the method may include associating the predetermined delay time with the second predefined localized movement responsive to a user input defining the predetermined delay time and/or assigning the second predefined localized movement thereto.

In some embodiments of the present invention, a localized movement of the housing in a user-defined pattern may be detected using the sensor. Parameters generated by the sensor corresponding to the user-defined pattern may be stored in a memory of the mobile device to define the second predefined localized movement.

In other embodiments of the present invention, the function may be a first function. A third predefined localized movement of the housing may be detected using the sensor, and the detected third predefined localized movement may be associated with a second function of the mobile device that is different from the first function. The second function may be performed responsive to detecting the third predefined localized movement and at a predetermined delay time after detecting the second predefined localized movement.

In some embodiments of the present invention, the predetermined delay time may be a first predetermined delay time, and a second predetermined delay time may also be associated with the second predefined localized movement. The first function may be performed at the first predetermined delay time after detecting the second predefined localized movement in a first mode of operation of the mobile device, and the second function may be performed at the second predetermined delay time after detecting the second predefined localized movement in a second mode of operation of the mobile device.

In other embodiments of the present invention, the predetermined delay time may be increased or decreased responsive to detecting the second predefined localized movement more than once in a predefined time period after detecting the first predefined localized movement and prior to performing the function. For example, the predetermined delay time may be increased or decreased by a predetermined time period responsive to each detection of the second predefined localized movement.

In some embodiments of the present invention, the function may be performed at the predetermined delay time after concurrently detecting the second predefined movement and depression of a button of the mobile device.

In other embodiments of the present invention, the function may be an alarm function, a camera timer function, a reminder function and/or a false rescue call function. For example, the function may be an audible alarm, the second predefined localized movement may be a shaking motion, and the audible alarm may be broadcast from a speaker of the mobile device at the predetermined delay time after detecting the shaking motion. As a further example, the function may be a false rescue call function, the second predefined localized movement may be a tilting motion, and a ringtone may be broadcast from a speaker of the mobile device at the predetermined delay time after detecting the tilting motion to provide the false rescue call.

According to some embodiments of the present invention, a mobile device having first and second modes of operation may include a mobile device housing, a sensor configured to detect localized movements of the housing, and a user interface configured to receive a user input assigning a particular predefined localized movement to first and second functions of the mobile device. The mobile device may further include a controller coupled to the sensor and the user interface and configured to associate the predefined localized movement with the first and second functions responsive to receiving the user input. The controller may be further configured to perform the first function responsive to detection of the predefined localized movement in the first mode of operation and perform the second function responsive to detection of the predefined localized movement in the second mode of operation.

In other embodiments of the present invention, the controller may be further configured to associate a predetermined delay time with the predefined localized movement and perform the first and/or second functions at the predetermined delay time after detection of the predefined localized movement.

In some embodiments of the present invention, the controller may be configured to detect a localized movement of the housing in a user-defined pattern using the sensor. A memory unit coupled to the controller may be configured to store parameters generated by the sensor corresponding to the user-defined pattern as the predefined localized movement.

In other embodiments of the present invention, the controller may be configured to detect the predefined localized movement using the sensor in a motion programming mode of operation of the mobile device that is different from the first and second modes of operation.

In some embodiments of the present invention, the user interface may include a keypad including a plurality of buttons. The controller may be further configured to perform the first and/or second functions responsive to concurrent detection of the predefined localized movement and depression of one of the plurality of buttons on the keypad.

According to further embodiments of the present invention, a mobile device may include a mobile device housing, a sensor configured to detect localized movements of the housing, and a controller coupled to the sensor. The controller may be configured to associate a predetermined delay time with a predefined localized movement, and perform a function of the mobile device at the predetermined delay time after detection of the predefined localized movement. More specifically, the controller may be configured to associate a first predefined localized movement of the housing with a function of the mobile device, and perform the function responsive to detection of the first predefined localized movement and at a predetermined delay time after detection of a second predefined localized movement of the housing.

In some embodiments of the present invention, a user interface coupled to the controller may be configured to receive a user input defining the predetermined delay time and/or assigning the predetermined delay time to the second predefined localized movement. The controller may be further configured to associate the predetermined delay time with the second predefined localized movement responsive to receiving the user input.

In other embodiments of the present invention, the controller may be configured to increase or decrease the predetermined delay time responsive to detection of the second predefined localized movement more than once in a predefined time period after detecting the first predefined localized movement and prior to performing the function. For example, the controller may be configured to increase or decrease the predetermined delay time by a predetermined time period responsive to each detection of the second predefined localized movement.

Although described above primarily with respect to method and device aspects, it will be understood that the present invention may be embodied as methods, electronic devices, and/or computer program products.

DETAILED DESCRIPTION OF EMBODIMENTS OF THE INVENTION

Figure 1:
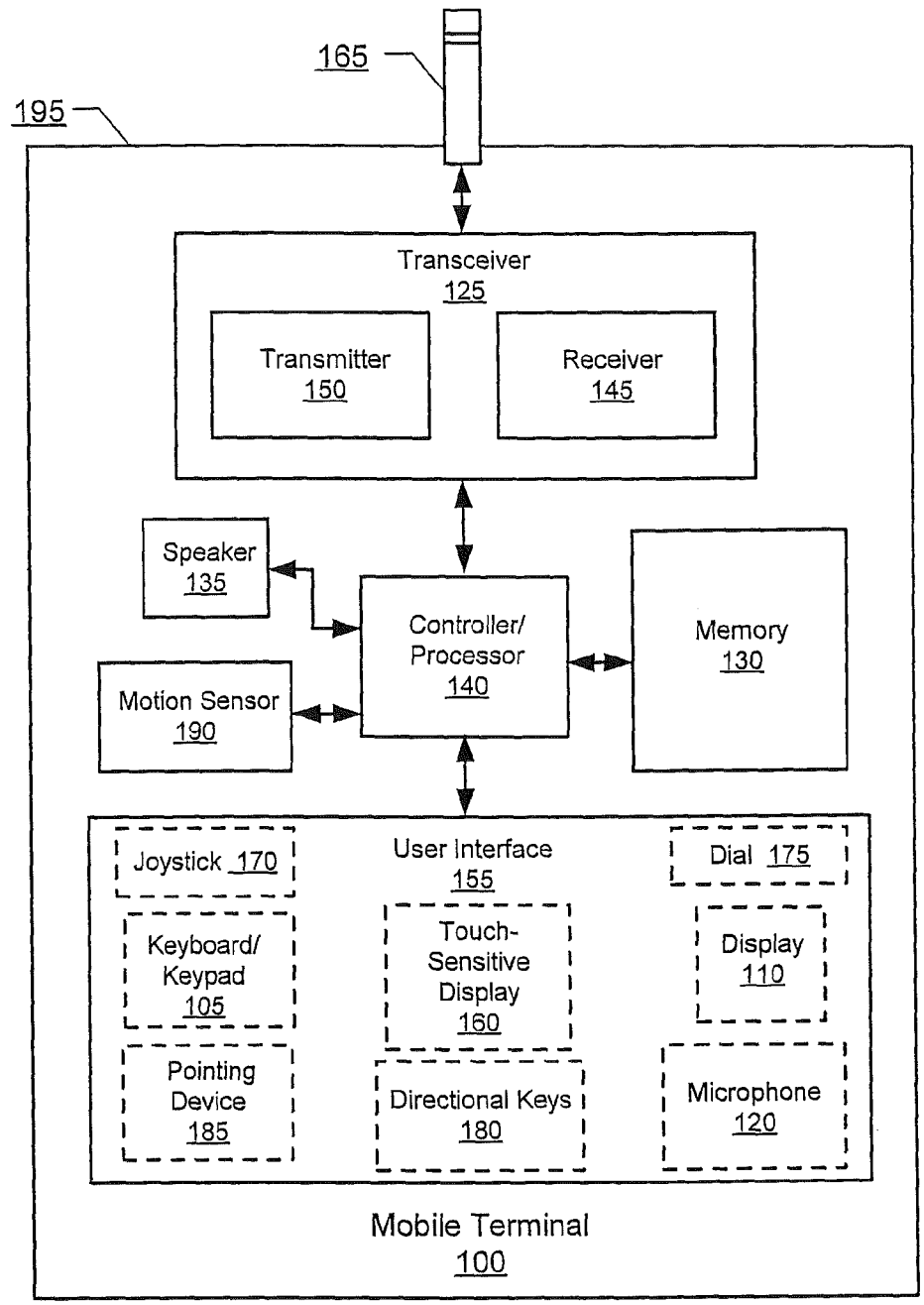
FIG. 1 is a block diagram that illustrates a mobile terminal in accordance with some embodiments of the present invention.

Specific exemplary embodiments of the invention now will be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the particular exemplary embodiments illustrated in the accompanying drawings is not intended to be limiting of the invention. In the drawings, like numbers refer to like elements.

As used herein, the singular forms "a," "an," and "the" are intended to include the plural forms as well, unless expressly stated otherwise. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items, and may be abbreviated as "/".

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention may be embodied as methods, electronic devices, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

As used herein, the term "mobile terminal" may include a satellite or cellular radiotelephone with or without a multi-line display; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver. Mobile terminals may also be referred to as "pervasive computing" devices.

For purposes of illustration, embodiments of the present invention are described herein in the context of a mobile terminal. It will be understood, however, that the present invention is not limited to such embodiments and may be embodied generally as any mobile electronic device that includes data storage functionality.

FIG. 1 is a block diagram illustrating a mobile terminal 100 in accordance with some embodiments of the present invention. Referring now to FIG. 1 the mobile terminal 100 includes a transceiver 125, a memory 130, a speaker 135, a controller/processor 140, a motion sensor 190 and a user interface 155 contained in a housing 195. The transceiver 125 typically includes a transmitter circuit 150 and a receiver circuit 145, which cooperate to transmit and receive radio frequency signals to and from base station transceivers via an antenna 165. The radio frequency signals transmitted between the mobile terminal 100 and the base station transceivers may include both traffic and control signals (e.g., paging signals/messages for incoming calls), which are used to establish and maintain communication with another party or destination. The radio frequency signals may also include packet data information, such as, for example, general packet radio system (GPRS) information. In addition, the transceiver 125 may include an infrared (IR) transceiver configured to transmit/receive infrared signals to/from other electronic devices via an IR port and/or may include a Bluetooth (BT) transceiver.

The memory 130 may represent a hierarchy of memory that may include volatile and/or non-volatile memory, such as removable flash, magnetic, and/or optical rewritable non-volatile memory. The user interface 155 may include a microphone 120, a display 110 (such as a liquid crystal display), a joystick 170, a keyboard/keypad 105, a touch sensitive display 160, a dial 175, a directional key(s) 180, and/or a pointing device 185 (such as a mouse, trackball, touch pad, etc.). However, depending on the particular functionalities offered by the mobile terminal 100, additional and/or fewer elements of the user interface 155 may actually be provided. For instance, the touch sensitive display 160 may be provided in a PDA that does not include a display 110, a keypad 105, and/or a pointing device 185.

The controller/processor 140 is coupled to the transceiver 125, the memory 130, the speaker 135, the motion sensor 190 and the user interface 155. The controller/processor 140 may be, for example, a commercially available or custom microprocessor (or processors) that is configured to coordinate and manage operations of the transceiver 125, the memory 130, the speaker 135, the motion sensor 190 and/or the user interface 155. With respect to their role in various conventional operations of the mobile terminal 100, the foregoing components of the mobile terminal 100 may be included in many conventional mobile terminals and their functionality is generally known to those skilled in the art.

Figure 2:
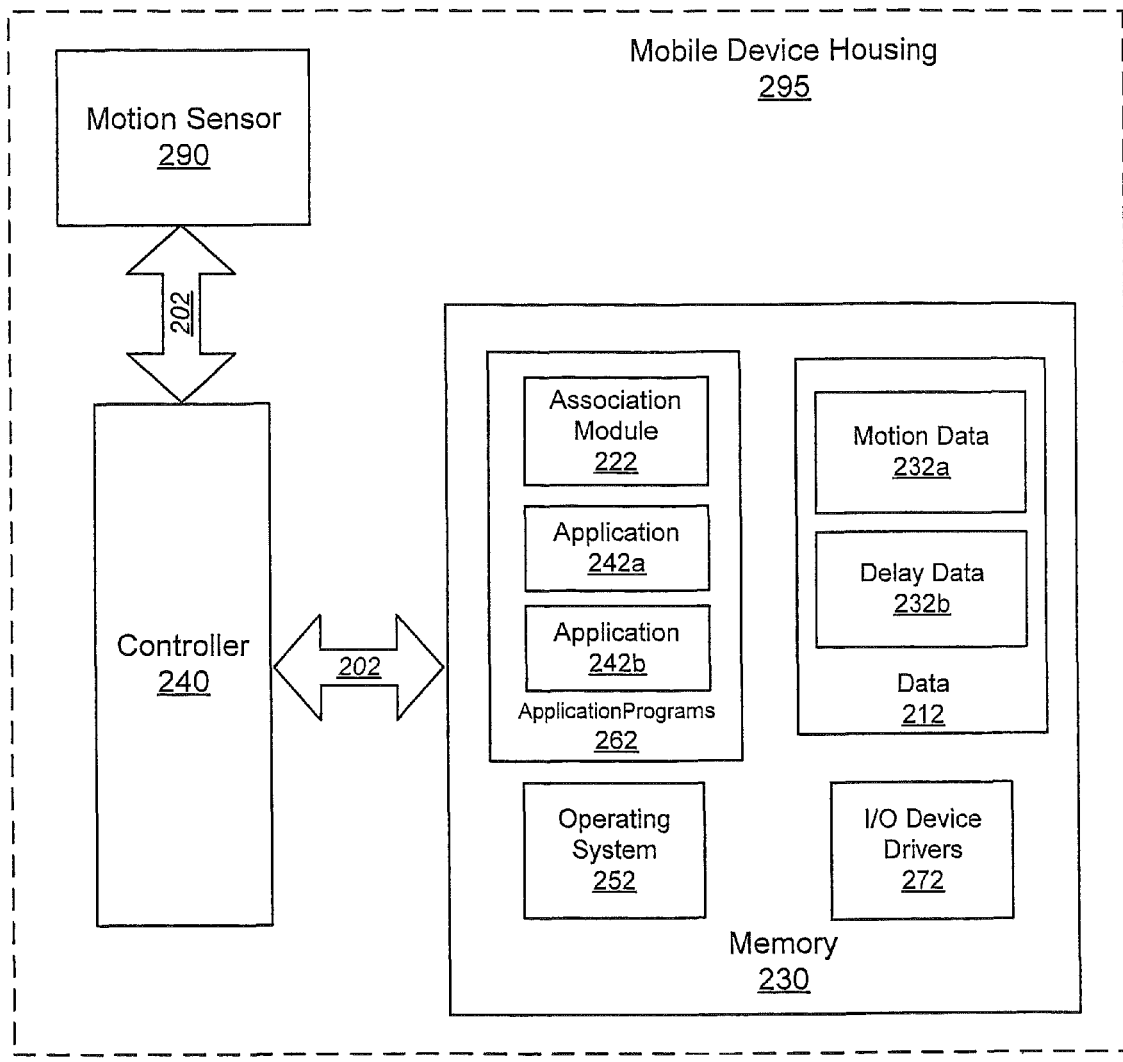
FIG. 2 is a block diagram that illustrates a hardware/software-architecture for operating a mobile device in accordance with some embodiments of the present invention.

FIG. 2 illustrates a hardware/software architecture for operating a mobile device, such as the mobile terminal 100 of FIG. 1, according to some embodiments of the present invention. As shown in FIG. 2, a mobile device housing 295 includes a motion sensor 290, a memory 230 and a controller 240 that may be used in operating a mobile electronic device. In some embodiments, the mobile device housing 295, the controller 240, the memory 230 and the motion sensor 290 may respectively correspond to the housing 195, the controller/processor 140, the memory 130, and the motion sensor 190 of the mobile terminal 100 of FIG. 1.

Referring now to FIG. 2, the controller 240 is configured to communicate with the memory 230 and the motion sensor 290 via an address/data bus 202. The memory 230 may be configured to store several categories of software and data, such as an operating system 252, applications programs 262, input/output (I/O) device drivers 272 and data 212. The operating system 252 controls the management and/or operation of system resources and may coordinate execution of applications and/or other programs by the controller 240. The I/O device drivers 272 typically include software routines accessed through the operating system 252 by the application programs 262 to communicate with input/output devices, such as those included in the user interface 155 of FIG. 1, and/or other components of the memory 230. The data 212 may include a variety of data used by the application programs 262 and/or the operating system 252. More particularly, according to some embodiments of the present invention, the data 212 may include motion data 232a, generated, for example, by the motion sensor 290, and delay data 232b.

The application programs 262 are illustrative of programs that implement various features and/or modes of operation according to embodiments of the present invention, and preferably include at least one application which supports operations for associating a predefined localized movement of the housing 295 with application programs and/or a predetermined delay time. More particularly, the application programs 262 may include an association module 222, as well as applications 242a and 242b configured to be executed in an application execution mode of operation of the mobile device.

Still referring to FIG. 2, the motion sensor 290 is configured to detect a predefined localized movement of the housing 295. For example, the motion sensor may be an accelerometer and/or a tilt sensor configured to detect tilting, shaking, waving and/or snapping of the mobile device housing 295. The predefined localized movement may be a default predefined movement stored in the memory 230 of the mobile device, or may be a user-defined movement. The motion sensor 290 may be configured to detect the predefined localized movement in a motion programming mode of operation of the mobile device. The controller 240 is configured to associate the detected predefined localized movement of the housing 295 with first and second functions of the mobile device, for example, using the association module 222. The controller 240 is further configured to perform the first function responsive to detection of the predefined localized movement in a first mode of operation of the mobile device, and perform the second function responsive to detection of the predefined localized movement in a second mode of operation of the mobile device.

For example, upon detection of a predefined localized movement of the mobile device housing 295, the motion sensor 290 may generate parameters that correspond to the detected predefined localized movement. These parameters may be stored in the memory 230 as motion data 232a. A user input assigning the detected predefined localized movement to the first and second functions of the mobile device may be received via a user interface coupled to the controller 240, such as the user interface 155 of FIG. 1. Responsive to receiving the user input, the controller 240 may associate the motion data 232a corresponding to the detected predefined localized movement with first and second functions of the mobile device, for example, using the association module 222. Upon subsequent detection of the predefined localized movement by the motion sensor 290, the controller 240 may perform the first function or the second function depending on the current mode of operation of the mobile device. For instance, the controller 240 may perform the first function upon detection of the predefined localized movement when the application 242a is executing on the mobile device, while the controller 240 may perform the second function upon detection of the predefined localized movement when the application 242b is executing on the mobile device.

Likewise, the controller 240 may be configured to perform the first function or the second function responsive to detection of the predefined localized movement by the motion sensor 290 in a particular profile and/or mode of operation of the mobile device. For instance, the controller 240 may perform the first function responsive to detecting the predefined localized movement when the mobile device is in a communication mode of operation, such as during a telephone call, and may perform the second function responsive to detecting the predefined localized movement when the mobile device in a standby mode of operation, i.e., where the mobile device is ready for use but is not currently in use. Moreover, the controller 240 may be configured to perform the first and/or second functions responsive to concurrent detection of the predefined localized movement and depression of one of a plurality of buttons on a keypad of the mobile device, such as the keypad 105 of FIG. 1. As such, accidental and/or unintended activation of the first and/or second functions due to inadvertent movement of the mobile device housing 295 may be avoided.

Again referring to FIG. 2, the controller 240 may also be configured to associate a predetermined delay time with the detected predefined localized movement, for example, using the association module 222. The predetermined delay time may be a default delay time or a user-definable delay time. The controller 240 may further be configured to perform the first and/or second function at the predetermined delay time after the detection of the predefined localized movement of the mobile device housing 295 by the motion sensor 290.

For example, a user input defining and/or assigning a predetermined delay time to the detected predefined localized movement may be received via a user interface, such as the user interface 155 of FIG. 1, coupled to the controller 240. Responsive to receiving the user input, the controller 240 may associate the predetermined delay time with the predefined localized movement, for example, using the association module 222. Upon subsequent detection of the predefined localized movement by the motion sensor 290, the controller 240 may perform a function associated with the predefined localized movement at the predetermined delay time after detection of the predefined localized movement of the housing 295. The function may be associated with the predefined localized movement by default and/or responsive to a user assignment. Also, the controller 240 may perform the function responsive to more than one predefined localized movement. For instance, using the association module 222, the controller 240 may associate a first predefined localized movement with the function, and may associate a second predefined localized movement with the predetermined delay. As such, the controller 240 may perform the function (responsive to detection of the first predefined localized movement) at the predetermined delay time after detection of the second predefined localized movement.

The controller 240 may be further configured to increase or decrease the predetermined delay time responsive to repeated detection of the predefined localized movement by the motion sensor 290 during a time period between initial detection of the predefined localized movement and performance of the function. For example, the controller may be configured to increase and/or decrease the predetermined delay time by a predetermined time period responsive to each detection of the predefined localized movement. Also, in some embodiments, the controller 240 may be configured to increase or decrease the predetermined delay time responsive to detection of a different predefined localized movement by the motion sensor 290 during the time period between initial detection of the predefined localized movement and performance of the associated function. Moreover, a first predefined movement may be associated with a first predetermined delay time, while a second predefined movement may be associated with a second predetermined delay time. In some embodiments, the controller 240 may be configured to perform the function at the predetermined delay time and/or increase/decrease the predetermined delay time responsive to concurrent detection of the predefined localized movement and depression of one of the buttons of the keypad, such as the keypad 105 of FIG. 1, to reduce the likelihood of unintended activation of the function and/or alteration of the delay time.

Although FIG. 2 illustrates an exemplary hardware/software architecture that may be used in mobile terminals and/or other electronic devices for controlling operation thereof, it will be understood that the present invention is not limited to such a configuration but is intended to encompass any configuration capable of carrying out operations described herein. For example, although the memory 230 is illustrated as separate from the controller 240, the memory 230 or portions thereof may be considered as a part of the controller 240. More generally, while particular functionalities are shown in particular blocks by way of illustration, functionalities of different blocks and/or portions thereof may be combined, divided, and/or eliminated. Moreover, the functionality of the hardware/software architecture of FIG. 2 may be implemented as a single processor system or a multi-processor system in accordance with various embodiments of the present invention.

Computer program code for carrying out operations of devices discussed above with respect to FIG. 2 may be written in a high-level programming language, such as Java, C, and/or C++, for development convenience. In addition, computer program code for carrying out operations of embodiments of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

The present invention is described hereinafter with reference to flowchart and/or block diagram illustrations of methods, mobile terminals, electronic devices, data processing systems, and/or computer program products in accordance with some embodiments of the invention. These flowchart and/or block diagrams further illustrate methods of operating mobile devices in accordance with various embodiments of the present invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks. These computer program instructions may also be stored in a computer usable or computer-readable memory that may direct a computer or other programmable data processing apparatus to function act in a particular manner, such that the instructions stored in the computer usable or computer-readable memory produce an article of manufacture including instructions that implement the function act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions acts specified in the flowchart and/or block diagram block or blocks.

Figure 3:
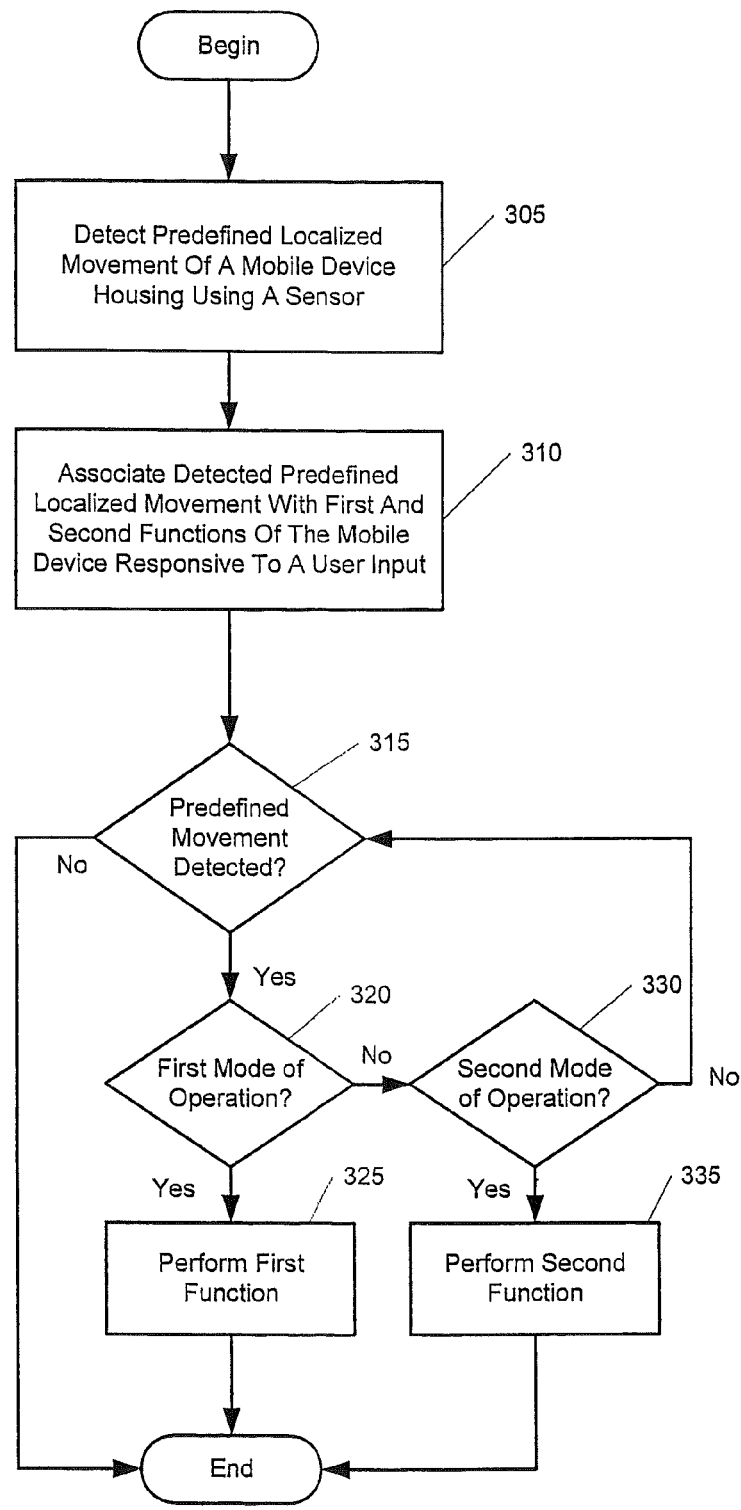
FIGS. 3 and 4A-B are flowcharts illustrating exemplary methods for operating a mobile device in accordance with some embodiments of the present invention.
Figure 4A:
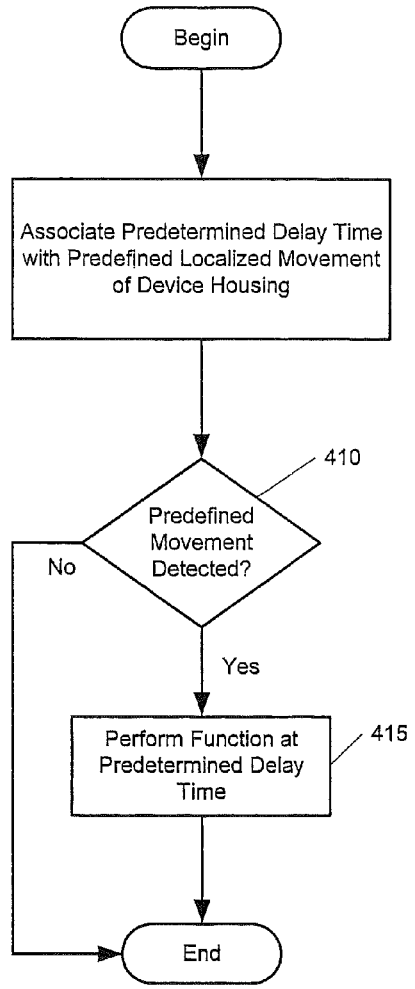
Figure 4B:
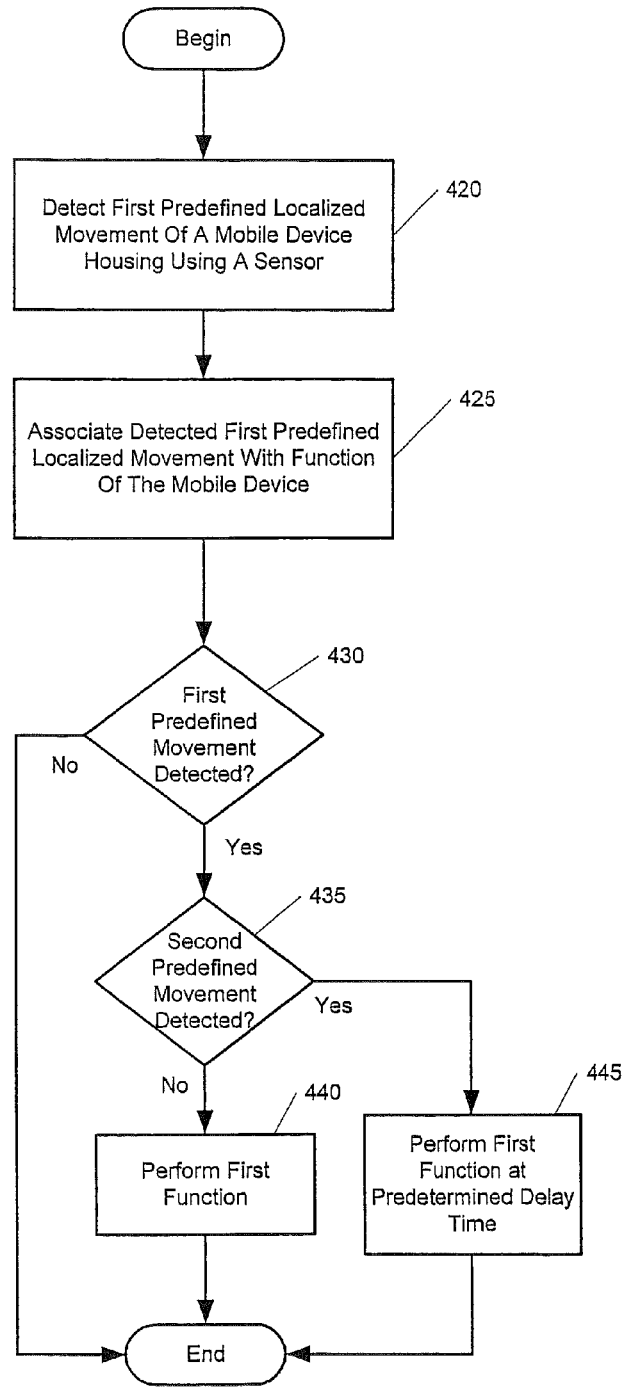

FIGS. 3 and 4A-B are-flowcharts illustrating exemplary methods for operating mobile devices in accordance with some embodiments of the present invention. Referring now to FIG. 3, operations begin at block 305 when a predefined localized movement of a mobile device housing, such as the mobile terminal housing 195 of FIG. 1, is detected using a sensor associated with the mobile device, such as the motion sensor 190. The detected predefined localized movement is associated with first and second functions of the mobile device responsive to a user input (block 310). For example, the user input may be received via a user interface, such as the user interface 155, to assign the detected predefined localized movement to the first and second functions of the mobile device. Upon subsequent detection of the predefined localized movement by the sensor (block 315), it is determined if the mobile device is in a first mode of operation (block 320) or a second mode of operation (block 330). If the mobile device is in the first mode of operation (block 320), the first function is performed (block 325) responsive to detecting the predefined localized movement. If the mobile device is in the second mode of operation (block 330), the second function is performed (block 335) responsive to detecting the predefined localized movement. However, if the predefined localized movement is detected (block 315) in a mode of operation other than the first or second mode, no function may be performed and operations end, so that accidental and/or unintended activation of the first and/or second functions due to inadvertent movement of the housing may be avoided.

Accordingly, a user of the mobile device may activate different device functions (based on the mode of operation of the mobile device) by moving the device housing in a predefined manner. For example, where the mobile device is a mobile terminal, such as the mobile terminal 100 of FIG. 1, the predefined localized movement may be an alphanumeric motion which may activate one function in a standby mode of operation and a different function in a messaging application execution mode of operation. For instance, responsive to detecting the alphanumeric motion (block 315) in the standby mode (block 320), a number associated with the alphanumeric motion may be dialed (block 325). As such, a user of a mobile terminal employing such functionality may dial an outgoing phone number by moving the mobile terminal housing in a sequence of alphanumeric motions corresponding to the desired phone number. Alternatively, responsive to detecting an alphanumeric motion (block 315) in the messaging application execution mode (block 330), an alphanumeric character associated with the alphanumeric motion may be shown on a display of the mobile terminal (block 335). As such, a user of the mobile terminal may enter alphanumeric characters, such as for text messaging, by moving the mobile terminal housing in a particular sequence of alphanumeric motions corresponding to the desired text to be input.

As a further example, the predefined localized movement may be a turnover motion (where the orientation of the mobile terminal relative to the user is altered), which may activate one function in the standby mode of operation and a different function in a communication mode of operation. For instance, upon receiving an incoming call at the mobile terminal in the standby mode (block 320), the incoming call may be rejected (block 325) responsive to detecting the turnover motion (block 315). However, upon accepting the call and activating the communication mode (block 330), a speakerphone function of the mobile device may be activated (block 335) responsive to detecting the turnover motion (block 315).

FIG. 4A illustrates additional methods of operating a mobile terminal according to some embodiments of the present invention. Referring now to FIG. 4A, operations begin at block 405 when a predetermined delay time is associated with a predefined localized movement of a housing of a mobile device, such as the housing 195 of the mobile terminal 100 of FIG. 1. The predetermined delay time may be a default and/or a user-defined delay time, which may be associated with the predefined localized movement by default and/or by a user assignment. Upon detection of the predefined localized movement (block 410) using a sensor associated with the mobile device, such as the motion sensor 190, a function of the mobile device associated with the predefined localized movement is performed at the predetermined delay time after detecting the predefined localized movement (block 415).

Accordingly, a user of the mobile device may perform time-delayed functions associated with one or more applications and/or modes of operation of the mobile device based on movement of the device housing in a predefined manner. Such time-delayed functions may include, for example, an alarm function, a camera timer function, a reminder function, and/or a false rescue call function. For instance, the user may associate a shaking motion with a predetermined delay time, such as 30 minutes, for an alarm function of the mobile device (block 405), and may set the alarm function to activate after the predetermined delay time by shaking the mobile device housing. Upon detection of the shaking motion (block 410), an audible alarm may be broadcast from the speaker of the mobile device 30 minutes after detecting the shaking motion (block 415).

As a further example, the user may associate a tilting motion with a predetermined delay time, such as 15 minutes, for a false rescue call function of the mobile device (block 405), and may initiate a false rescue call by tilting the mobile device housing. Upon detection of the tilting motion (block 410), a ring tone may be broadcast from a speaker of the mobile device 15 minutes after detecting the tilting motion (block 415). As such, the user may gracefully excuse himself from an undesirable and/or awkward situation using the false rescue call.

As yet another example, the user may associate a waving motion with a predetermined delay time, such as 10 seconds, for a camera timer function of the mobile device (block 405), and may activate the camera timer by waving the mobile device housing. Upon detection of the waving motion (block 410), an image capture function may be activated 10 seconds after detecting the waving motion (block 415).

Moreover, multiple predetermined delay times may be implemented. For example, a first predefined localized movement may be associated with a first predetermined delay time, and a second predefined localized movement different from the first may be associated with a second predetermined delay time (block 405). As such, a particular device function may be performed at either the first or the second predetermined delay time (block 415) responsive to detecting either the first or the second predefined localized movement (block 410), respectively.

FIG. 4B illustrates further methods of operating a mobile terminal according to some embodiments of the present invention. Referring now to FIG. 4B, operations begin at block 420 when a first predefined localized movement of a mobile device housing, such as the mobile terminal housing 195 of FIG. 1, is detected using a sensor associated with the mobile device, such as the motion sensor 190. The detected first predefined localized movement is associated with a function of the mobile device (block 425). Upon subsequent detection of the first predefined localized movement (block 430), it is determined if a second predefined localized movement of the device housing is detected (block 435). The second predefined localized movement may be different than the first movement, and may be detected after detection of the first predefined localized movement but before performance of the function associated with the first predefined localized movement. If the second predefined localized movement is not detected at block 435, the function is performed (block 440) responsive to the detection of the first predefined localized movement. However, if the second predefined localized movement is detected at block 435, the function is performed at the predetermined delay time after detection of the second predefined localized movement (block 445). As such, a first predefined localized movement may initiate performance of a function, while a second, different predefined localized movement may provide a predetermined delay for performing the function.

Figure 5:
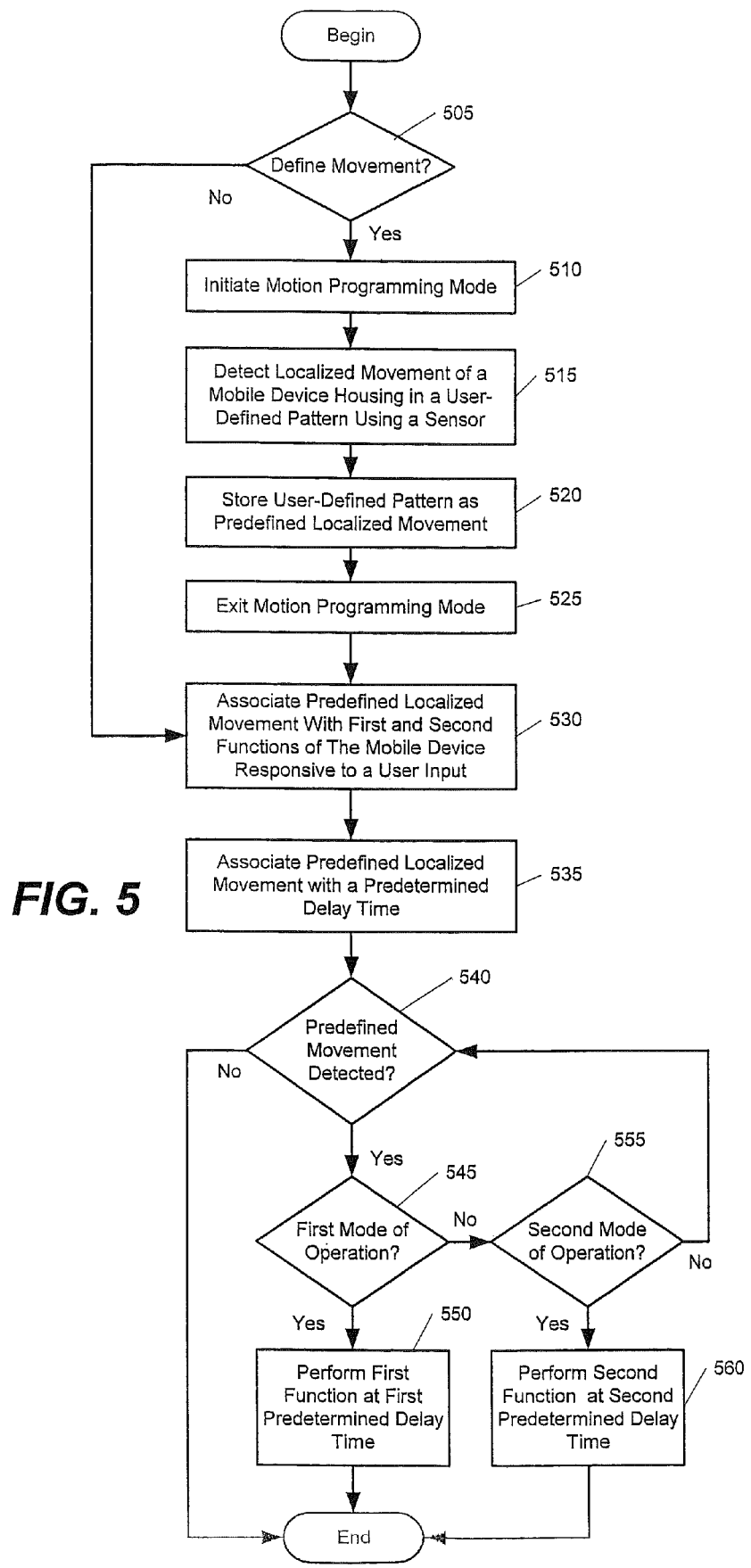
FIGS. 5 and 6 are flowcharts illustrating exemplary methods for operating a mobile device in accordance with further embodiments of the present invention.
Figure 6:
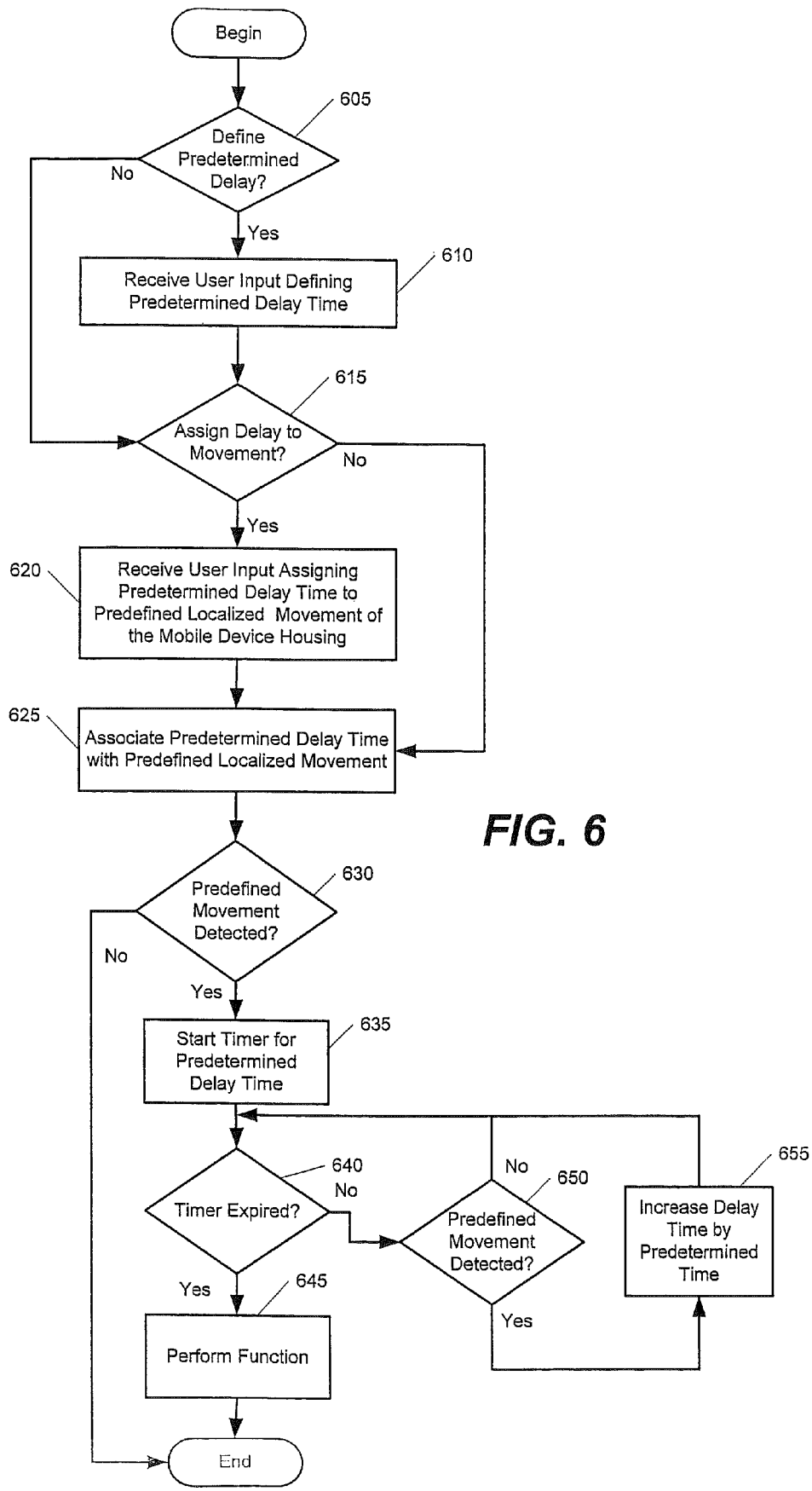

FIGS. 5 and 6 are flowcharts further illustrating methods for operating a mobile device in accordance with some embodiments of the present invention. Referring now to FIG. 5, operations begin at block 505 when it is determined whether a user wishes to define a predefined localized movement of the mobile device housing. If so, a motion programming mode of operation is initiated (block 510) where a user may provide a localized movement of the housing in a user-defined pattern. The localized movement of the housing in the user-defined pattern is detected (block 515) using a sensor associated with the mobile device. The detected predefined localized movement may be confirmed, for example, by prompting the user, and the user-defined pattern is stored as the predefined localized movement (block 520). More particularly, parameters generated by the sensor corresponding to the detected localized movement of the housing in the user-defined pattern are stored in a memory of the mobile device to define the predefined localized movement. The motion programming mode of operation is exited (block 525), and the detected predefined localized movement is associated with first and second functions of the mobile device responsive to receiving a user input (block 530). A predetermined delay time may also be associated with the detected predefined localized movement (block 535).

Still referring to FIG. 5, upon subsequent detection of the predefined localized movement in conjunction with depression of a particular button on the keypad of the mobile device (block 540), it is determined whether the mobile device is in a first mode of operation (block 545) or a second mode of operation (block 555). If the device is in the first mode of operation (block 545), the first function is performed at the predetermined delay time after detecting the predefined localized movement (block 550). Alternatively, if the device is in the second mode of operation (block 555), the second function is performed at the predetermined delay time after detecting the predefined localized movement (block 560). If the device is in neither the first nor the second mode of operation when the predefined localized movement is detected (block 540), or if depression of the particular button on the keypad is not detected, no device function may be performed and operations end. As such, accidental and/or unintended activation of the first and/or second functions may be avoided.

The following examples further illustrate operation of a mobile device responsive to detection of specific predefined movements with reference to FIG. 5. In one example, a user may wish to define a sweeping motion as the predefined localized movement (block 505), which may be detected (block 515), stored (block 520), and associated with a wireless device search function and a presence update function (block 530). Upon detection of the sweeping motion (block 540) in a standby mode of operation (block 545), a search for wireless devices and/or networks in the vicinity of the mobile device may be performed (block 550). For example, the mobile device may search for available Bluetooth and/or Wi-Fi connection options responsive to detecting the sweeping motion in the standby mode. Alternatively, upon detection of the sweeping motion (block 540) in a messaging application execution mode (block 555), presence information for the user may be updated (block 560). For example, a user's availability for receiving instant messages may be updated to parties on the user's "buddy list" responsive to detecting the sweeping motion in the messaging application execution mode.

As a further example, a user may wish to define a heart-shaped motion as the predefined localized movement (block 505), which may be detected (block 515), stored (block 520), and associated with first and second device functions, such as an outgoing call function and a text messaging function (block 530). The outgoing call function may be used in the standby mode, while the text messaging function may be used in the messaging application execution mode. Upon detection of the heart-shaped motion (block 540) in the standby mode of operation (block 545), a phone number associated with a third party, such as a significant other, may be dialed (block 550). Alternatively, upon detection of the heart-shaped motion (block 540) in the messaging application execution mode (block 555), a predefined text message may be transmitted to the third party (block 560). As such, a user of the mobile device may contact a third party, either by voice call or by text message, simply by moving the mobile device housing in the heart-shaped motion.

FIG. 6 illustrates methods for operating a mobile device according to further embodiments of the present invention. Referring now to FIG. 6, operations begin at block 605 when it is determined whether a user wishes to define a delay time for activating a mobile device function associated with a predefined localized movement of the mobile device housing. If so, a user input defining the predetermined delayed time is received (block 610). It is also determined whether a user wishes to assign the predetermined delay time to a particular predefined localized movement of the mobile device housing (block 615), and if so, a user input assigning the predefined localized movement to the predetermined delay time is received (block 620). The predetermined delay time is associated with the predefined localized movement responsive to the user input (block 625). The predefined localized movement may be a default movement, or may be defined by a user as described above with reference to FIG. 5.

Upon detection of the predefined localized movement (block 630), a timer is initiated corresponding to the duration of the predetermined delay time (block 635). The timer may be implemented, for example, by software and/or hardware in a controller/processor of the mobile device, such as the controller/processor 140 of FIG. 1. If it is determined that the timer has expired (block 640), the mobile device function associated with the predefined localized movement is performed (block 645). The associated mobile device function may be a default function and/or may be assigned to the predefined localized movement by a user as described above with reference to FIG. 5. If the timer has not expired (block 640), it is determined whether another predefined localized movement is detected (block 650). For example, the predefined localized movement associated with the predetermined delay time may be detected more than once prior to expiration of the timer. Alternatively, a second predefined localized movement that is different from the predefined localized movement detected at block 630 may be detected prior to expiration of the timer at block 650. If another predefined localized movement is detected (block 650) prior to expiration of the timer, the predetermined delay time is increased (block 655). For example, the predetermined delay time may be increased (block 655) responsive to each repeated detection of the predefined localized movement (block 650) prior to expiration of the timer. As a further alternative, if another predefined localized movement is detected prior to expiration of the timer, the function to be performed may be cancelled. However, if no other predefined localized movement is detected (block 650) prior to expiration of the timer, the function associated with the predefined localized movement is performed (block 645) at the original predetermined delay time.

Thus, according to some embodiments of the present invention, a user of a mobile device may activate different device functions by moving the device housing in a predefined localized manner based on the current mode of operation of the mobile device. The predefined localized movement may be user-definable, and the particular device functions associated with the predefined localized movement may be user-customizable. Moreover, time-delayed functions associated with one or more applications and/or modes of operation may be activated based on one or more predefined localized movements of the device housing.

In the drawings and specification, there have been disclosed exemplary embodiments of the invention. However, many variations and modifications can be made to these embodiments without substantially departing from the principles of the present invention. Accordingly, although specific terms are used, they are used in a generic and descriptive sense only and not for purposes of limitation, the scope of the invention being defined by the following claims.

That which is claimed:

1. A method of operating a mobile device having first and second modes of operation, the method comprising:
   detecting a predefined localized movement of a housing of the mobile device using a sensor associated therewith;
   associating the detected predefined localized movement with first and second functions of the mobile device responsive to a user input assigning the detected predefined localized movement thereto;
   performing the first function responsive to detecting the predefined localized movement in the first mode of operation; and
   performing the second function responsive to detecting the predefined localized movement in the second mode of operation.

2. The method of claim 1, wherein detecting a predefined localized movement comprises:
   detecting a localized movement of the housing in a user-defined pattern using the sensor; and
   storing parameters generated by the sensor corresponding to the user-defined pattern in a memory of the mobile device to define the predefined localized movement.

3. The method of claim 1, wherein detecting a predefined localized movement comprises: detecting the predefined localized movement in a motion programming mode of operation of the mobile device different from the first and second modes of operation.

4. The method of claim 3, wherein the first mode of operation comprises a communication mode, and wherein the second mode of operation comprises a standby mode.

5. The method of claim 3, wherein the first and/or second mode of operation comprises an application execution mode in which a particular application on the mobile device is executing.

6. The method of claim 1, wherein performing the first and/or second functions further comprises:
   performing the first and/or second functions responsive to concurrently detecting the predefined localized movement and depression of a button of the mobile device.

7. The method of claim 1, wherein the predefined localized movement comprises tilting, shaking, waving, and/or snapping the mobile device housing.

8. The method of claim 1, wherein the predefined localized movement comprises an alphanumeric motion, wherein the first mode of operation comprises a standby mode, wherein the second mode of operation comprises a messaging application execution mode, and wherein performing the first and second functions comprises:
   dialing a number associated with the alphanumeric motion responsive to detecting the alphanumeric motion in the standby mode; and
   displaying a character associated with the alphanumeric motion responsive to detecting the alphanumeric motion in the messaging application execution mode.

9. The method of claim 1, wherein the predefined localized movement comprises a turn-over motion, wherein the first mode of operation comprises a standby mode, wherein the second mode of operation comprises a communication mode, and wherein performing the first and second functions comprises:
   rejecting an incoming call responsive to detecting the turn-over motion in the standby mode; and
   activating a speakerphone of the mobile device responsive to detecting the turn-over motion in the communication mode.

10. A computer program product for operating a mobile device, the computer program product comprising a non-transitory computer readable storage medium having computer readable program code embodied therein configured to carry out the method of claim 1.

11. The method of claim 1, wherein the first function is different than the second function.

12. A mobile device having first and second modes of operation, comprising:
   a mobile device housing;
   a sensor configured to detect localized movements of the housing;
   a user interface configured to receive a user input assigning a particular predefined localized movement to first and second functions of the mobile device; and
   a controller coupled to the sensor and the user interface and configured to associate the predefined localized movement with the first and second functions responsive to receiving the user input, wherein the controller is further configured to perform the first function responsive to detection of the predefined localized movement in the first mode of operation and perform the second function responsive to detection of the predefined localized movement in the second mode of operation.

13. The device of claim 12, wherein the controller is configured to detect a localized movement of the housing in a user-defined pattern using the sensor, and further comprising:
   a memory unit coupled to the controller and configured to store parameters generated by the sensor corresponding to the user-defined pattern as the predefined localized movement.

14. The device of claim 12, wherein the controller is configured to detect the predefined localized movement using the sensor in a motion programming mode of operation of the mobile device that is different from the first and second modes of operation.

15. The device of claim 12, wherein the user interface comprises a keypad including a plurality of buttons, and wherein the controller is further configured to perform the first and/or second functions responsive to concurrent detection of the predefined localized movement and depression of one of the plurality of buttons.

16. The device of claim 12, wherein the predefined localized movement comprises tilting, shaking, waving, and/or snapping the mobile device housing.

17. The device of claim 12, wherein the predefined localized movement comprises an alphanumeric motion, wherein the first mode of operation comprises a standby mode, wherein the second mode of operation comprises a messaging application execution mode, and wherein the first and second functions comprise:
   dialing a number associated with the alphanumeric motion responsive to detecting the alphanumeric motion in the standby mode; and
   displaying a character associated with the alphanumeric motion responsive to detecting the alphanumeric motion in the messaging application execution mode.

18. The device of claim 12, wherein the predefined localized movement comprises a turn-over motion, wherein the first mode of operation comprises a standby mode, wherein the second mode of operation comprises a communication mode, and wherein the first and second functions comprise:
- rejecting an incoming call responsive to detecting the turn-over motion in the standby mode; and
- activating a speakerphone of the mobile device responsive to detecting the turn-over motion in the communication mode.

19. The device of claim 12, wherein the first function is different than the second function.

* * * * *